(12) United States Patent
Konuskan et al.

(10) Patent No.: US 9,788,283 B2
(45) Date of Patent: Oct. 10, 2017

(54) METHOD AND DEVICE OF PERFORMING MULTI-RADIO ACCESS BEARER POWER SCALING

(71) Applicant: TELEFONAKTIEBOLAGET L M ERICSSON (PUBL), Stockholm (SE)

(72) Inventors: Cagatay Konuskan, Oslo (NO); Billy Hogan, Sollentuna (SE); Andreas Andersson, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 14/761,978

(22) PCT Filed: Jan. 7, 2014

(86) PCT No.: PCT/SE2014/050011
§ 371 (c)(1),
(2) Date: Jul. 20, 2015

(87) PCT Pub. No.: WO2014/112930
PCT Pub. Date: Jul. 24, 2014

(65) Prior Publication Data
US 2015/0319715 A1 Nov. 5, 2015

Related U.S. Application Data

(60) Provisional application No. 61/754,033, filed on Jan. 18, 2013.

(51) Int. Cl.
*G08C 17/00* (2006.01)
*H04W 52/34* (2009.01)
(Continued)

(52) U.S. Cl.
CPC ....... *H04W 52/346* (2013.01); *H04W 52/146* (2013.01); *H04W 52/286* (2013.01);
(Continued)

(58) Field of Classification Search
None
See application file for complete search history.

(56) References Cited

U.S. PATENT DOCUMENTS 9,258,791 B2 * 2/2016 Konuskan ......... H04W 72/0473
455/522
2008/0144741 A1 * 6/2008 Dominique .......... H04B 17/327
375/317
(Continued)

OTHER PUBLICATIONS

Huawei et al: UL CLTD Impact on Physical Layer Procedures, 3GPP Draft; R1-111405 $3^{rd}$ Generation Partnership Project (3GPP), Mobile Competence Centre; 650, Route des Lucioles; F06921 Sophia-Antipolis Cedex; France., vol. RAN WG1, No. Barcelona, Spain; Sep. 5, 2011. May 2011.
(Continued)

*Primary Examiner* — Anh-Vu Ly (57) ABSTRACT

The present disclosure relates to a method and user equipment, UE, in a wireless communication network of performing power scaling on uplink transmission to a receiving radio access node, RAN. In particular, the disclosure relates to a method and user equipment for power scaling on uplink transmissions on a multi-radio access bearer, multi-RAB, wherein a Dedicated Physical Data Channel, DPDCH, and enhanced Data Channels, E-DCHs are configured for uplink transmission from the UE to the receiving RAN. The method comprises determining a total UE transmit power exceeding a predetermined maximum power limit value. The total UE transmit power is reduced to the predetermined maximum power limit value by reducing one or more E-DPDCH gain factors by an equal scaling factor. When a predetermined minimum E-DPDCH gain factor, 'smallest quantised βed,k value', is reached for all E-DPDCH gain factors βed,k, and DTX is applied for all E-DPDCHs, the method comprises applying DTX on E-DPCCH.

15 Claims, 3 Drawing Sheets

(51) Int. Cl.
*H04W 52/14* (2009.01)
*H04W 52/28* (2009.01)
*H04W 52/36* (2009.01)
*H04W 88/02* (2009.01)
*H04W 88/10* (2009.01)

(52) U.S. Cl.
CPC ....... *H04W 52/362* (2013.01); *H04W 52/367* (2013.01); *H04W 52/287* (2013.01); *H04W 88/02* (2013.01); *H04W 88/10* (2013.01); *Y02B 60/50* (2013.01)

(56) References Cited

U.S. PATENT DOCUMENTS

| | | |
|---|---|---|
| 2010/0273520 A1 | 10/2010 | Pelletier et al. |
| 2010/0322090 A1* | 12/2010 | Zhang .................. H04W 52/42 370/252 |
| 2015/0163754 A1* | 6/2015 | Konuskan ......... H04W 72/0473 455/522 |

OTHER PUBLICATIONS

Ericsson et al: DTX E-DPCCH when Power Scaling in Multi-RAB. A 3GPP Draft; R1-130608 25.214 CR0704 (REL-11. F) 3rd Generation Partnership Project (3GPP). Mobile Competence Centre; 650, Route des Lucioles; F-06921 Sophia-Antipolis Cedex; France.; F-06921 SOP vol. RAN WG1, No. St Julian; 20130128-20130201. Jan. 19, 2013 (Jan. 19, 2013).

3rd Generation Partnership Project; Technical Specification Group Radio Access Network; Physical layer procedures (FDD) (Release 11). 3GPP Standard; 3GPP TS 25.214. 3rd Generation Partnership Project (3GPP), Mobile Competence Centre; 650, Route des Lucioles; F-06921 Sophia-Antipolis Cedex; France. vol. RAN WG1, No. V11.3.0, Sep. 18, 2012.

* cited by examiner

METHOD AND DEVICE OF PERFORMING MULTI-RADIO ACCESS BEARER POWER SCALING

This application claims the benefit of U.S. Provisional Application No. 61/754,033, filed Jan. 18, 2013, the disclosure of which is fully incorporated herein by reference.

TECHNICAL FIELD

The present disclosure relates to a method and user equipment, UE, in a wireless communication network, for performing power scaling on uplink transmission to a receiving radio access node. In particular, the disclosure relates to a method and user equipment for power scaling on uplink transmissions on a multi-radio access bearer, multi-RAB, wherein a Dedicated Physical Data Channel, DPDCH, and an enhanced Dedicated Physical Data Channel, E-DPDCH are configured for uplink transmission from the UE to the receiving radio access node.

BACKGROUND

Figure 1:
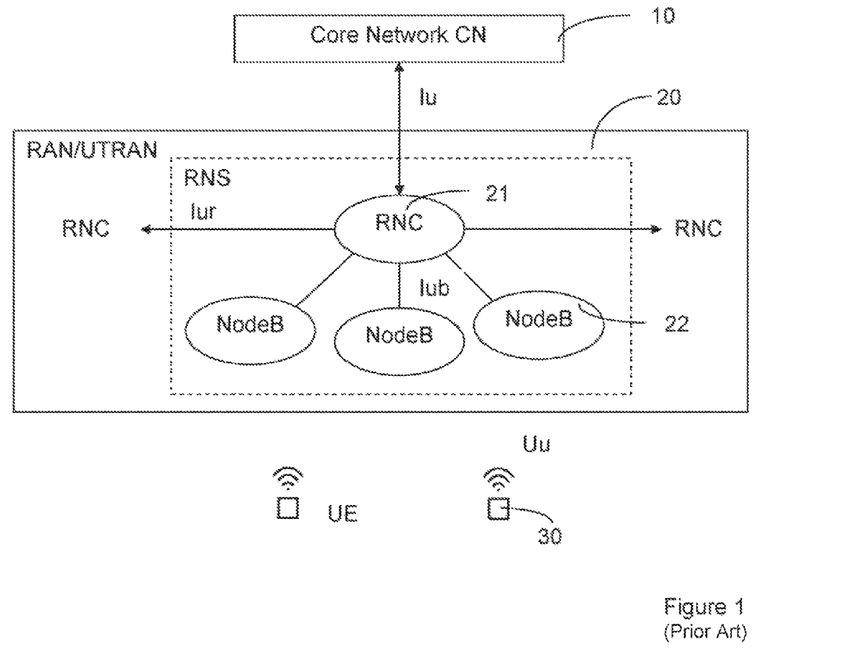
FIG. 1 schematically illustrates a Universal Mobile Telecommunications Systems, UMTS, network.

One example cellular communications system is Universal Mobile Telecommunications Systems, UMTS, Wideband Code Division Multiple Access, W-CDMA. Wireless communication systems following UMTS technology, were developed as part of Third Generation, 3G, Radio Systems, and is maintained by the Third Generation Partnership Project, 3GPP. A mobile radio communication system, such as a UMTS type system, includes a mobile radio communication network communicating with wireless devices, also known as mobile terminals or user equipments, UEs and with external networks. The UMTS network architecture includes a Core Network, CN, interconnected with a UMTS Terrestrial Radio Access Network, UTRAN, via an Iu interface. The UTRAN is configured to provide wireless telecommunication services to users through mobile radio terminals, referred to as user equipments, UEs, in the 3GPP standard, via a Uu radio interface. A commonly employed air interface defined in the UMTS standard is W-CDMA. The UTRAN has one or more radio network controllers, RNC, and base stations, referred to as Node Bs by 3GPP, which collectively provide for the geographic coverage for wireless communications with UEs. Uplink, UL, communications refer to transmissions from UE to Node B, and downlink, DL, communications refer to transmissions from Node B to UE. One or more Node Bs are connected to each RNC via an Iub interface; RNCs within a UTRAN communicate via an Iur interface. An example block diagram of an UMTS WCDMA is shown in FIG. 1.

Radio transmitters are generally limited in total transmit power, a limit imposed by regulatory agencies or by the battery or power amplifier technology. This power limitation may result in reduced radio coverage. For example, as user equipment, UE, moves away from its Node B base station, it typically increases its transmission power to maintain the same level of quality at the base station. The UE output power is controlled by the Node B base station via one or more power control loops. When the UE reaches a maximum power and may no longer increase its power to maintain the signal quality desired at the base station, power scaling is applied. Power scaling implies increasing power to increase output power of one or more transmitted channels without changing the geometry, shape or principle of the transmission. This may occur for example when the UE is close to cell-edge, or when the UE enters a region of deep signal fade.

Mobile networks with High Speed Packet Access, HSPA, include High Speed Downlink Packet Access, HSDPA, and High Speed Uplink Packet Access, HSUPA, or Enhanced Uplink, EUL. The enhanced uplink introduces two new code-multiplexed uplink physical channels: an enhanced data channel, E-DCH Dedicated Physical Data Channel, E-DPDCH, and an enhanced control channel, E-CCH Dedicated Physical Control Channel, E-DPCCH. In EUL, the Dedicated Physical Control Channel, DPCCH, carries pilot, power control, and Inner Loop Power Control, ILPC, information. The transport format of EUL is designated as E-DCH Transport Format Combination, E-TFC. A standard E-TFC table is set forth in 3GPP specification 25.321. A transmit power gain factor named $\beta ed$ is used to indicate the enhanced data channel E-DPDCH amplitude for each E-TFC in the table, and a transmit power gain factor named $\beta ec$ is used to indicate the amplitude of E-DPCCH. The power level of the DPDCH is indicated by $\beta d$ for each transport format, and the parameter $\beta c$ is used to indicate the DPCCH transmit power level. A predetermined small minimum transmit power level of E-DPDCH is specified using $\beta ed$, min in the 3GPP specification 25.214. In the uplink, DPCCH is used as a power reference with the power offset of all the other physical channels being defined relative to the DPCCH power.

Figure 2:
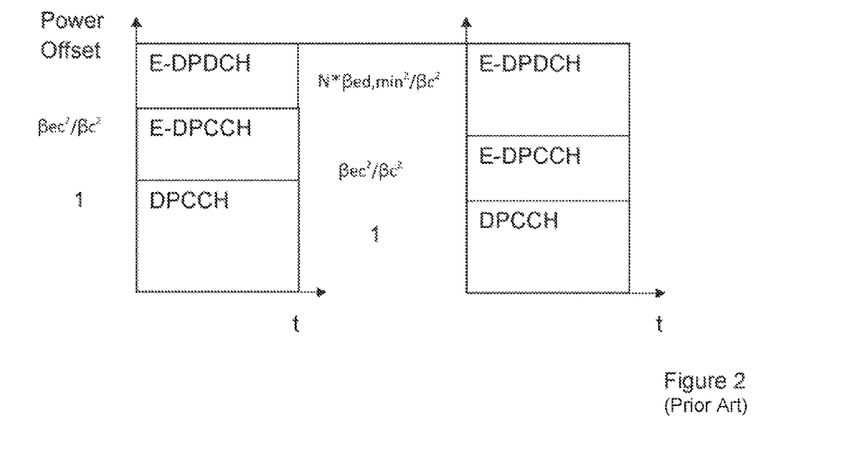
FIG. 2 illustrates power allocation for enhanced uplink, EUL.

A configurable transmit power gain factor $\beta ed$, min sets a minimum power level for the E-DCH; thereby avoiding excessive downscaling of the data channel E-DCH. The configurable $\beta ed$, min permits a better trade-off of the power allocation between the E-DCH and the DPCCH control channel during UE power limitation, which in turn improves the EUL coverage. FIG. 2 illustrates power allocated for E-DCH with and without a configurable $\beta ed$, min, illustrated on the right hand side and left hand side of the figure. As illustrated, when using a configurable transmit power gain factor $\beta ed$, min, more power may be allocated to the E-DCH channel.

TS 25.214, "Physical layer procedures (FDD)", ver. 11.3.0, 2012-09-19, describes current 3GPP power scaling. In subsection 5.1.2.6, power scaling handling when a UE is power limited is described. Subsection 5.1.2.6 sets forth different power scaling procedures which are applied depending on if DPDCH is configured or not, and if E-DCH configured or not. Here, the term "configured" means that physical channel radio resources are reserved for transmission. The configuration when E-DCH is not configured and DPDCH is configured is from now on referred to as configuration 1. The configuration when E-DCH is configured and DPDCH is not configured is from now on referred to as configuration 2. The configuration when both E-DCH and DPDCH are configured is from now on referred to as configuration 3. To say that E-DCH is configured means that one or more E-DPDCH(s) physical channel resources are reserved for uplink transmission from user equipment, UE, to NodeB. Similarly, to say that DPDCH is configured means that one or more DPDCH(s) physical channel resources are reserved for transmission from user equipment, UE, to NodeB.

In the power scaling applied for configuration 1, the power scaling procedures inform the UE, after applying DPCCH power adjustments and gain factors, to apply additional scaling to the total transmit power so that it is equal to the maximum allowed power. DPCCH/DPDCH and DPCCH/HS-DPCCH power ratios are maintained.

In the power scaling applied for configurations 2 and 3 where E-DCH is configured, the user equipment, UE, after applying DPCCH power adjustments and gain factors, first reduces all the E-DPDCH gain factors βed,k by an equal scaling factor to respective values βed,k,reduced so that the total transmit power is equal to the maximum allowed power. Then, power scaling procedures differ depending on whether a DPDCH is configured. In the power scaling applied for configuration 2, where DPDCH is not configured, the power scaling follows a procedure which, depending on a network-configurable transmit power gain factor βed,min sets a limit on how much the user equipment may scale down the E-DPDCH gain factors βed,k. At this point, if the user equipment, UE, transmit power still exceeds the maximum allowed transmit power limit, equal scaling is applied to all channels, similar to what is done for the power scaling applied for configuration 1. This procedure gives the network control over a relative lower bound of the E-DPDCH gain factors βed,k and in turn improves the EUL coverage as described above.

In power scaling applied for configuration 3 where DPDCH also is configured, the power scaling procedure allows downscaling of E-DPDCH gain factors βed,k,reduced down to the 'smallest quantized βed,k value' (see the definition in TS 25.214, "Physical layer procedures (FDD)", ver. 11.3.0, 2012-09-19). If βed,k,reduced is lower than the 'smallest quantized βed,k value' then discontinuous transmission, DTX, of the E-DPDCH(s) is(are) allowed. Discontinuous transmission implies temporarily muting or shutting off transmission on one or more specified channels. The DTX procedure secures performance of DPDCH traffic over E-DCH traffic.

SUMMARY

The present disclosure relates to user equipment transmit power control and provides a more adequate multi-radio access bearer, multi-RAB, power scaling configuration. It is an object of the present disclosure to provide a method and user equipment that provides improved coverage for Dedicated Physical Data Channel, DPDCH, traffic. The disclosed method enables an improved power scaling for multi-RAB.

The present disclosure presents a method performed in a user equipment, UE, operating in a wireless communication network, of performing power scaling on uplink transmissions to a receiving radio access node, RAN, on a multi-radio access bearer, multi-RAB. A Dedicated Physical Data Channel, DPDCH, and an enhanced Dedicated Physical Data Channel, E-DPDCH are configured for uplink transmissions from the UE to the receiving RAN. The method comprises determining that a total UE transmit power exceeds a predetermined maximum power limit value. The total UE transmit power is reduced to the predetermined maximum power limit value by reducing one or more E-DPDCH gain factors, βed,k, by a scaling factor to one or more reduced power scaling values βed,k,reduced. When a predetermined minimum E-DPDCH gain factor, 'smallest quantised βed,k value' is reached for all E-DPDCH gain factors βed,k, and discontinuous transmission, DTX, is applied for all E-DPDCHs, discontinuous transmission, DTX, is applied on E-DPCCH.

The disclosed method provides the advantage of enabling a more situational correct power setting for multi-RAB. Furthermore, the disclosed method provides the advantage of freeing user equipment power headroom which can be used by the user equipment to increase power on the remaining channels, e.g, DPCCH, DPDCH and possibly HS-DPCCH, improving coverage for DPDCH traffic.

According to an aspect of the disclosure, the step of applying DTX on E-DPCCH further presupposes determining if data is transmitted on the DPDCH.

It is a significant advantage of the disclosure that it provides a power scaling procedure adapted to a DPDCH transmission status; so that discontinuous transmission of E-DPCCH is only applied when there is an actual need of an additional power headroom for DPDCH.

According to a further aspect of the disclosure, the total UE transmit power is divided between at least one DPDCH and a DPCCH according to a power ratio when data is transmitted on the at least one DPDCH.

The sharing of the total UE transmit power, i.e. the UE power headroom, in accordance with a given power ratio further provides the advantage of a further improved DPDCH coverage.

According to another aspect of the disclosure, the discontinuous transmission, DTX, on E-DPCCH is cancelled when power headroom of the UE increases and DTX is cancelled on at least one E-DPDCH.

The ability to continuously adapt a power-scaling of the UE to the actual situation and to apply or cancel DTX based on power headroom of the UE, provides for an optimized throughput for the U E.

According to an aspect of the disclosure, the method is performed in a user equipment operative in a wideband code division multiple access, W-CDMA, Universal Mobile Telecommunications Systems, UMTS.

The disclosed method is developed based on legacy 3GPP power scaling procedures; thus proposed additional power scaling procedures may easily be implemented in a user equipment operative in W-CDMA UMTS.

The present disclosure also presents a user equipment, UE, for a wireless communication network, the UE being configured for performing power scaling on uplink transmission to a receiving radio access node, RAN, on a multi-radio access bearer, multi-RAB. A Dedicated Physical Data Channel, DPDCH, and an enhanced Dedicated Physical Data Channel E-DPDCH are configured for uplink transmission from the UE to the receiving RAN. The UE comprises a radio transceiving circuitry and an enhanced uplink, EUL, processor. The EUL processor comprises a UE transmission power determining entity configured to determine that a total UE transmit power exceeds a predetermined maximum power limit value. A UE power reduction entity is configured to reduce the total UE transmit power to the predetermined maximum value by reducing one or more E-DPDCH gain factors, βed,k by a scaling factor to one or more reduced power scaling values βed,k,reduced. A power scaling entity is configured to apply DTX on E-DPCCH when a predetermined, minimum E-DPDCH gain factor, 'smallest quantised βed,k value' is reached for all E-DPDCH gain factors, βed,k, and DTX is applied for all E-DPDCHs.

According to an aspect of the disclosure, a DPDCH transmission determining entity is configured to determine a DPDCH transmission status and the power scaling entity is configured to apply DTX on E-DPCCH when data is transmitted on the DPDCH.

According to another aspect of the disclosure, the power scaling entity is further configured to divide the total UE transmit power between at least one DPDCH and a DPCCH according to a power ratio.

According to a further aspect, the power scaling entity is further configured to further reduce the total UE transmit power to the predetermined maximum power limit value whilst maintaining the power ratio.

According to an aspect of the disclosure, the power scaling entity is configured to cancel DTX on the E-DPCCH when DTX is cancelled on at least one E-DPDCH.

According to yet an aspect of the disclosure, the user equipment, UE, is operative in a wideband code division multiple access, W-CDMA, Universal Mobile Telecommunications Systems, UMTS.

The user equipment displays advantages corresponding to the advantages already described in relation to the method.

The present disclosure also relates to a computer program, comprising computer readable code which, when run on a processing circuitry of a user equipment, UE, causes the user equipment to perform the method disclosed above and below.

With the above in mind, the object of the present disclosure is to overcome at least some of the disadvantages of known technology as described above and below.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor, DSP, hardware, a reduced instruction set processor, hardware (e.g., digital or analog) circuitry including but not limited to application specific integrated circuits, ASIC, and/or field programmable gate array(s), FPGA, and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment, UE, it should be understood by the person skilled in the art that UE is a non-limiting term comprising any wireless device or node equipped with a radio interface allowing for at least one of: transmitting signals in the uplink, UL, and receiving and/or measuring signals in the downlink, DL. Some examples of UE in its most general sense are a PDA, laptop, mobile, sensor, fixed relay, mobile relay, and a radio network node, e.g. a small base station using the terminal technology.

FIG. 1 illustrates an example block diagram of UMTS network architecture where the proposed technique is implemented. The network architecture includes a Core Network 10, CN, interconnected with a UMTS Terrestrial Radio Access Network 20, UTRAN, via an Iu interface. The UTRAN 20 is configured to provide wireless telecommunication services to users through mobile radio terminals, referred to as user equipments 30, UEs, in the 3GPP standard, via a Uu radio interface. A commonly employed air interface defined in the UMTS standard is W-CDMA. The UTRAN has one or more radio network controllers 21, RNC, and base stations 22, referred to as Node Bs by 3GPP, which collectively provide for the geographic coverage for wireless communications with UEs 30. Uplink, UL, communications refer to transmissions from UE to Node B, and downlink, DL, communications refer to transmissions from Node B to UE. One or more Node Bs 22 are connected to each RNC 21 via an Iub interface; RNCs within a UTRAN communicate via an Iur interface. The technology in this disclosure relates to the radio interface Uu between a NodeB 22, and a UE 30.

As previously discussed, the UE radio transmitters are limited in total transmit power. As a UE 30 moves away from a Node B 22 to which the UE is attached, it increases its transmission to maintain the same level of quality at the base station. The UE 30 output power is controlled by the NodeB 22. When the UE 30 reaches a maximum power and no longer has the ability to increase its power to maintain the signal quality desired at the base station, power scaling is applied. Exemplary situations of such power scaling include the situation when a UE 30 is close to a cell edge or when the UE 30 reaches a region of deep signal fade.

As previously mentioned in the background section, FIG. 2 illustrates prior art power allocation for Enhanced Uplink, EUL, in a mobile network with High Speed Packet Access, HSPA. Power scaling for E-DCH with a configurable βed, min is illustrated on the right-hand side. A configurable transmit power gain factor βed, min sets a minimum power level for the E-DCH; thereby avoiding excessive downscaling of the data channel E-DCH. The configurable βed, min permits a better trade-off of the power allocation between the E-DCH and the DPCCH control channel during UE power limitation, which in turn improves the EUL coverage. FIG. 2 illustrates power allocated for E-DCH with and without a configurable βed, min, illustrated on the right hand side and left hand side of the figure. As illustrated, when using a configurable transmit power gain factor βed, min, more power may be allocated to the E-DCH channel. EUL introduced two new code-multiplexed uplink physical channels: an enhanced Data Channel, E-DCH, enhanced Dedicated Physical Data Channel, E-DPDCH and an enhanced Control Channel, E-DCH, enhanced Dedicated Physical Control Channel, E-DPCCH. In EUL, the Dedicated Physical Control Channel, DPCCH carries pilot, power control and Inner Loop Power Control (ILPC) information. A transmit power gain factor named βed is used to indicate the enhanced data channel E-DPDCH amplitude for each E-DCH transport format combination. A transmit power gain factor βec is used to indicate the amplitude of E-DPCCH. The power level of DPDCH is indicated by Pd for each transport format and the parameter βc is used to indicate the DPCCH transmit power level. In the 3GPP specification 25.214, a predetermined minimum transmit power level of E-DPDCH is specified as βed,min. In the uplink, DPCCH is used as a power reference with the power offset of all the other physical channels being defined relative to the DPCCH power. The use of a configurable transmit power gain factor βed,min avoids excessive downscaling of the data channel E-DCH power. The configurable βed,min permits a better trade of between the power allocation between the E-DCH and DPCCH control channel during UE power limitation/scaling. The 3GPP specification 25.214 "Physical layer procedures (FDD)", ver. 11.3.0, 2012-09-19 describes legacy 3GPP power scaling in detail. Subsection 5.1.2.6 discloses power scaling procedures that are applied depending on if DPDCH is configured or not, and if E-DCH is configured or not. The term configured here applies to the situation where physical channel radio resources have been reserved for transmission.

Figure 3:
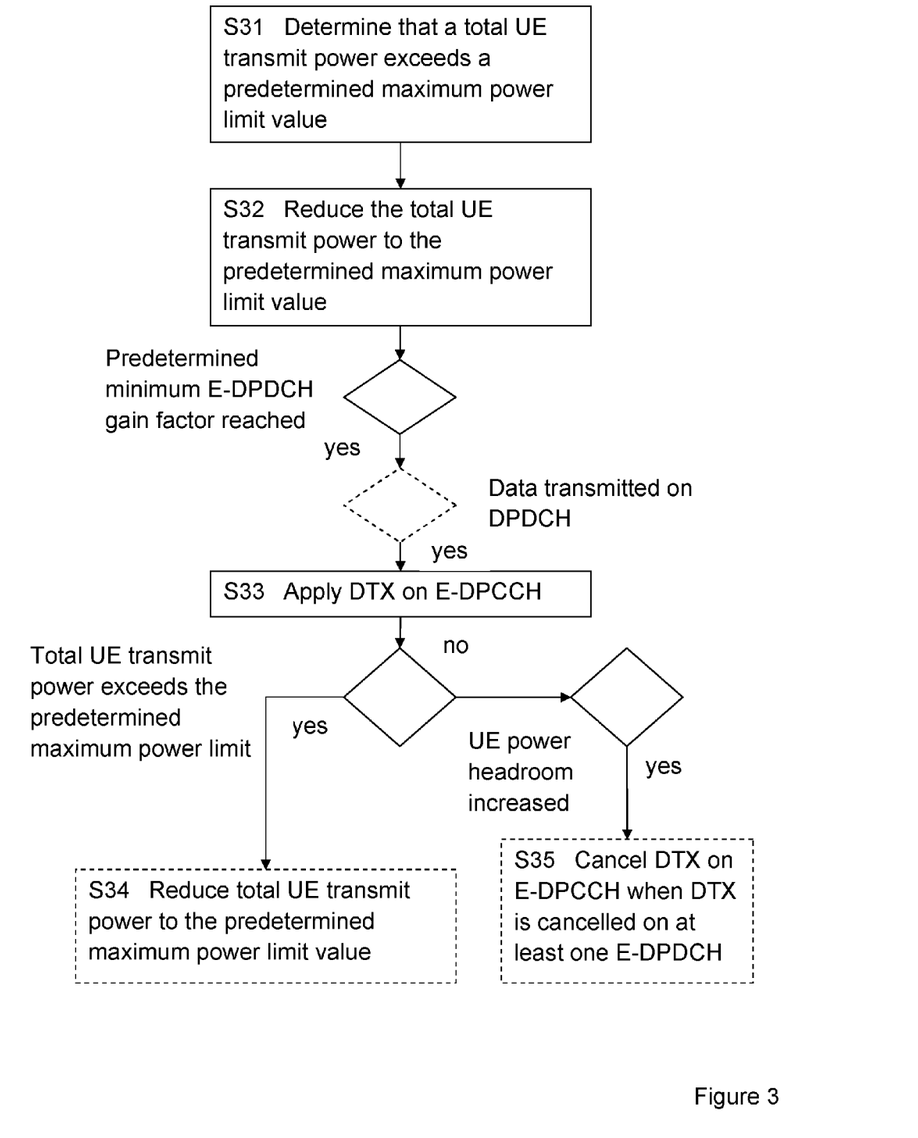
FIG. 3 is a flow chart illustrating exemplary method steps for performing multi-radio access bearer power scaling in a user equipment.

FIG. 3 discloses a flow chart illustrating example method steps for performing multi-radio access bearer power scaling in a user equipment, UE. The disclosure is based on the idea that by introducing DTX for E-DCH, it will be possible to direct apply improved power scaling to the speech channels.

The user equipment is configured to perform the power scaling method steps for uplink transmission to a receiving radio access node, RAN/UTRAN, in a wireless communication network on a multi-radio access bearer, multi-RAB. The disclosed power scaling procedure is applicable when E-DCH is configured; thus for Enhanced Uplink, EUL, in a mobile network with High Speed Packet Access, HSPA. A Dedicated Physical Data Channel, DPDCH, and an enhanced Dedicated Physical Data Channel, E-DPDCH are configured for uplink transmission from the UE to the receiving RAN.

In a first step S31, the UE determines that the total UE transmit power exceeds a predetermined maximum power limit value. The total UE transmit power level is an instantaneous level where the UE transmit power of all channels together exceeds a limit, over e.g. a slot that is a period of 0.67 ms). The instantaneous level is defined in current 3GPP specifications, e.g. the referenced 3GPP 25.214 specification. The determining in the UE follows on receipt of power control information from the NodeB, instructing the UE that power control must be exercised. This is part of legacy procedures, e.g as described in the referenced 3GPP specification 25.214, and will not be discussed herein.

In a first power reduction step S32, the UE reduces total UE transmit power to the predetermined maximum power limit value. Reduction of total UE transmit power includes applying DPCCH power adjustments and gain factors. Subsequently, the UE reduces all the E-DPDCH gain factors βed,k by an equal scaling factor to respective values βed,k, reduced so that the total UE transmit power is equal to the maximum allowed power.

In the power scaling applied for the transmission status where DPDCH is not transmitted, the power scaling procedure allows downscaling of E-DPDCH gain factors βed,k reduced down to the 'smallest quantized βed,k value' according to the definition in TS 25.214 "Physical layer procedures (FDD)", ver. 11.3.0, 2012-09-19). If βed,k reduced is lower than the 'smallest quantized βed,k value' then discontinuous transmission, DTX, of the one or more E-DPDCH is allowed. When a predetermined minimum E-DPDCH gain factor, 'smallest quantised βed,k, value' is reached for all E-DPDCH gain factors βed,k, DTX is allowed on all E-DPDCH, i.e. the E-DPDCH will be muted when there is a need to increase power for the speech channels DPDCH and DPCCH. In step S33, DTX is then also applied on E-DPCCH when DTX is applied for all E-DPDCHs. When all E-DPDCH channels are DTX:ed, additional headroom is enabled by also applying DTX on the E-DPCCH.

As will be further detailed below, the disclosed method is particularly beneficial in a scenario wherein E-DCH is configured and DPDCH is transmitted, i.e. a multi-RAB scenario. In accordance with an aspect of the disclosed method, the step of applying S33 DTX on E-DPCCH is further based on a determination if data is transmitted on the DPDCH, thus presupposing a determination whether data is transmitted on the DPDCH prior to proceeding to step S33 and applying DTX on E-DPCCH. Since it is an object of the present disclosure to free UE power headroom which the UE can utilize for increased power on the remaining channels, e.g. DPCCH, DPDCH and possibly HS-DPCCH, providing improved coverage for DPDCH, conditioning the additional power scaling on DPDCH-transmission is non-limiting to the disclosure, but provides the additional benefit of avoiding useless adjustments.

In order to further to have the maximum benefits on the DPDCH traffic from the additional UE power headroom, the total UE transmit power is divided between at least one DPDCH and a DPCCH according to a power ratio when data is transmitted on the at least one DPDCH.

In a scenario wherein the total UE transmit power still exceeds the predetermined maximum power limit following the DTX of E-DPDCHs as well as of E-DPCCH, the UE further reduces the total transmit UE power in step 34 whilst maintaining the power ratio when the total UE transmit power still exceeds the predetermined maximum power limit.

Conversely, when the UE detects, e.g. forms a decision, that at least one E-DPDCH no longer needs to operate in a discontinuous transmission, DTX, mode, the UE then cancels, S35, DTX for the E-DPCCH as well as for the E-DPDCH. The UE brings the E-DPCCH and one or more E-DPDCHs into active states.

According to an aspect of the disclosure, the method is performed in a user equipment operative in a wideband code division multiple access, W-CDMA, Universal Mobile Telecommunications Systems, UMTS. However, the principles of the technology described are also applicable to other radio access technologies.

The disclosure also relates to a computer program, comprising computer readable code which, when run on a processing circuitry of a user equipment, UE, causes the user equipment to perform the above disclosed method embodiments.

Figure 4:
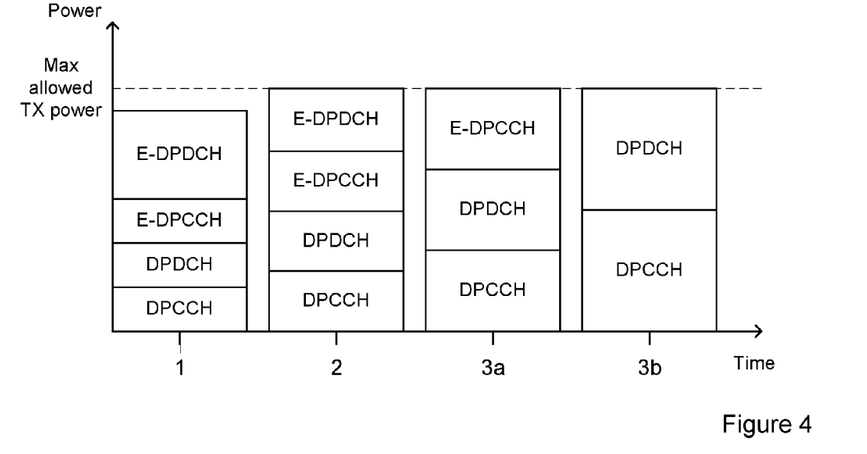
FIG. 4 shows an example of power-scaling in a multi-RAB UE when entering a power limited range.

FIG. 4 shows an example of power-scaling in a multi-RAB UE while entering a power limited range, e.g. when moving toward a cell edge. At time instant 1, the UE has not reached the power limited range and all channels are transmitted with no power scaling applied. At time instant 2, the UE has entered the power limited range, and the E-DPDCH gain factors are scaled down to a value βed,k, reduced so as not to exceed the maximum allowed transmit power limit. But since βed,k,reduced is not smaller than the 'smallest quantised βed,k value', DTX is not applied on E-DPDCH, so E-DPDCH is also transmitted. At time instant 3 (which includes 3a and 3b), the UE becomes power limited, and the E-DPDCH gain factors are scaled down to a value βed,k, reduced smaller than the 'smallest quantised βed,k value', and the UE applies DTX to E-DPDCH. Scenario 3a, which is a version of time instant 3, shows the power scaling procedures according to the current standard, according to which DTX is not applied to the E-DPCCH but DTX is applied to the E-DPDCH. Scenario 3b shows how the UE proposed herein functions in this respect, i.e., the UE applies DTX on the E-DPCCH as well, since the UE has detected that all E-DPDCHs are DTX:ed. Commonly, it is the UE that decides to place all E-DPDCHs in DTX.

Scenario 3b clearly shows that with such a UE, additional power is left for the DPCCH and the DPDCH thereby increasing DPDCH coverage.

Figure 5:
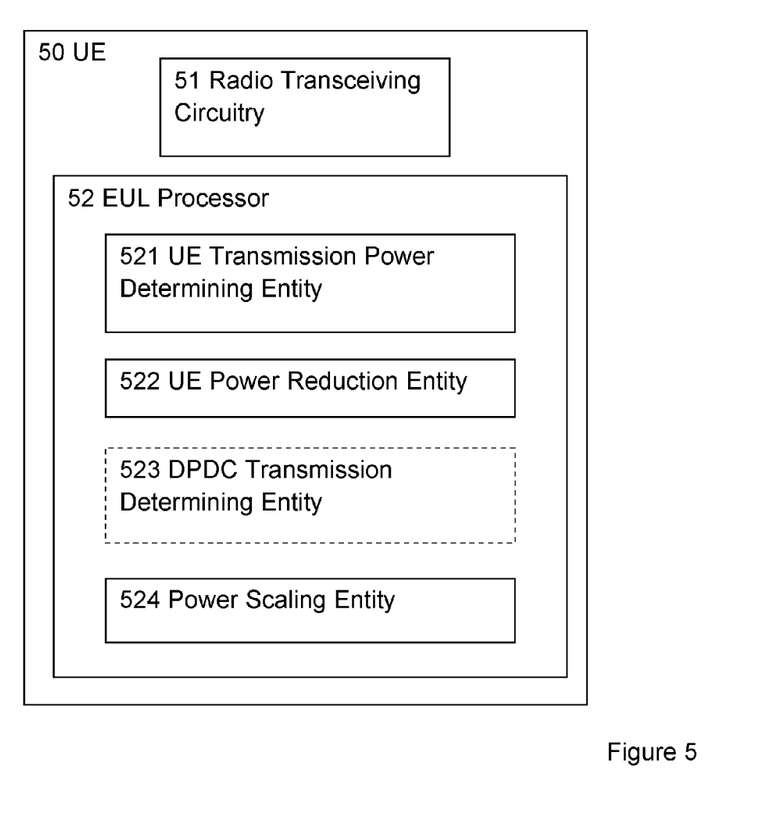
FIG. 5 is a block diagram schematically illustrating a user equipment embodiment.

FIG. 5 shows a non-limiting exemplary block diagram of a user equipment 50, the UE being configured for performing power scaling on uplink transmission to a receiving radio access node RAN/UTRAN, on a multi-radio access bearer, multi-RAB. A Dedicated Physical Data Channel, DPDCH, and an enhanced Dedicated Physical Data Channel E-DPDCH are configured for uplink transmission from the UE to the receiving RAN. The user equipment 50 comprises a radio transceiving circuitry 51 and an enhanced uplink, EUL processor 52. A UE transmission power determining entity 521 in the EUL processor is configured to determine when a total UE transmit power exceeds a predetermined maximum power limit value. The EUL processor further comprises a UE power reduction entity 522 configured to reduce the total UE transmit power to the predetermined maximum value by reducing one or more E-DPDCH gain factors, βed,k, by a scaling factor to one or more reduced power scaling values βed,k,reduced. A power scaling entity 524 is configured to apply DTX on E-DPCCH when a predetermined minimum E-DPDCH gain factor, 'smallest quantised βed,k value', is reached for all E-DPDCH gain factors, βed,k, and DTX is applied for all E-DPDCHs.

The EUL processor also comprises one or more βed,k tables used in the performance of the disclosed power scaling procedures.

As was previously discussed with reference to FIG. 4, scenario 3b in particular, DTX of E-DPCCH is beneficial in order to enable additional power headroom for PDDCH transmission. Consequently, the EUL processor includes, in one embodiment, a DPDCH transmission determining entity 523 configured to determine a DPDCH transmission status. The power scaling entity 524 is then configured to select a power scaling procedure based on the determined DPDCH transmission, i.e. if there is DPDCH transmission, and to apply the selected power scaling procedure when there is DPDCH transmission.

Further benefits are achieved in the embodiment wherein the power scaling entity 524 of the UE 50 is configured to divide the total UE transmit power between at least one DPDCH and a DPCCH according to a power ratio.

When the total UE transmit power continues to exceed the predetermined maximum power limit value, an embodiment of the power scaling entity 523 is further configured to reduce the total UE transmit power to the predetermined maximum power value whilst maintaining the power ratio. Conversely, the UE is also arranged to detect, e.g. form a decision on, if at least one E-DPDCH has come out of DTX and into an active state. In such an active state, when DTX is cancelled on at least one E-DPDCH, the power scaling entity is configured to cancel DTX on the E-DPCCH and also bring the E-DPCCH out of DTX and into an active state.

A UE embodiment within the scope of the present disclosure is operative in a wideband code division multiple access, W-CDMA, Universal Mobile Telecommunications Systems, UMTS, context. However, the disclosed embodiment is an example embodiment, and it is to be noted that the principles of the technology described is also applicable to other radio access technologies.

The above technology has been presented with reference to an implementation in the 3GPP standard TS 25.214, "Physical layer procedures (FDD)", ver. 11.3.0 2012-09-19. However, the disclosure is not limited to such an implementation; any implementation covered by the claim language is intended to fall within the scope of the disclosure.

Although the description above contains many specifics, they should not be construed as limiting but as merely providing illustrations of some presently preferred example embodiments. For example, non-limiting, example embodiments of the technology were described in a WCDMA UMTS context. But the principles of the technology described may also be applied to other radio access technologies. Indeed, the technology fully encompasses other embodiments which may become apparent to those skilled in the art. Reference to an element in the singular is not intended to mean one and only one unless explicitly so stated, but rather "one or more." None of the above description should be read as implying that any particular element, step, range, or function is essential.

The invention claimed is:

1. A method performed in a user equipment, UE, operating in a wireless communication network, of performing power scaling on uplink transmissions to a receiving radio access node, RAN, on a multi-radio access bearer, multi-RAB, wherein a Dedicated Physical Data Channel, DPDCH, and an enhanced Dedicated Physical Data Channel, E-DPDCH are configured for uplink transmissions from the UE to the receiving RAN, the method comprising the steps of:

determining that a total UE transmit power exceeds a predetermined maximum power limit value;

reducing the total UE transmit power to the predetermined maximum power limit value, by reducing one or more E-DPDCH gain factors, βed,k, by a scaling factor to one or more reduced power scaling values βed,k, reduced; and     applying DTX on enhanced Dedicated Physical Control Channel, E-DPCCH, when data is transmitted on the DPDCH and a predetermined minimum E-DPDCH gain factor, 'smallest quantised βed,k value', is reached for all E-DPDCH gain factors βed,k, and DTX is applied for all E-DPDCHs.

2. The method of claim 1, wherein the total UE transmit power is divided between at least one DPDCH and a DPCCH according to a power ratio when data is transmitted on the at least one DPDCH.

3. The method of claim 2, comprising:

further reducing the total UE transmit power whilst maintaining the power ratio when the total UE transmit power still exceeds the predetermined maximum power limit.

4. The method of claim 1:
when a power headroom of the UE increases, cancelling DTX on E-DPCCH when DTX is cancelled on at least one E-DPDCH.

5. The method of claim 1, wherein the wireless communication network is Universal Mobile Telecommunications Systems, UMTS, wideband code division multiple access, W-CDMA.

6. A user equipment, UE, for a wireless communication network, the UE being configured for performing power scaling on uplink transmission to a receiving radio access node, RAN, on a multi-radio access bearer, multi-RAB, wherein a Dedicated Physical Data Channel, DPDCH, and an enhanced Dedicated Physical Data Channel E-DPDCH are configured for uplink transmission from the UE to the receiving RAN, the UE comprising
a radio transceiving circuitry; and
an enhanced uplink, EUL, processor, the processor configured to:
determine that a total UE transmit power exceeds a predetermined maximum power limit value;
reduce the total UE transmit power to the predetermined maximum value by reducing one or more E-DPDCH gain factors, $\beta_{ed,k}$, by a scaling factor to one or more reduced power scaling values $\beta_{ed,k,reduced}$;
determine a DPDCH transmission status;
apply DTX on enhanced Dedicated Physical Control Channel, E-DPCCH, when data is transmitted on the DPDCH and when a predetermined minimum E-DPDCH gain factor, 'smallest quantised $\beta_{ed,k}$ value', is reached for all E-DPDCH gain factors, $\beta_{ed,k}$, and DTX is applied for all E-DPDCHs.

7. The user equipment, UE, of claim 6, wherein the processor is further configured to divide the total UE transmit power between at least one DPDCH and a DPCCH according to a power ratio.

8. The user equipment, UE, of claim 7, wherein the processor is further configured to further reduce the total UE transmit power to the predetermined maximum power limit value whilst maintaining the power ratio.

9. The user equipment, UE, of claim 6, wherein the processor is configured to cancel DTX on the E-DPCCH when DTX is cancelled on at least one E-DPDCH.

10. The user equipment, UE, of claim 6, wherein the wireless communication network is Universal Mobile Telecommunications Systems, UMTS, wideband code division multiple access, W-CDMA.

11. A user equipment (UE) for a wireless communication network, the UE comprising computer readable code which, when run on a processing circuitry of the UE causes the UE to perform power scaling on uplink transmissions to a receiving radio access node, RAN, on a multi-radio access bearer, multi-RAB, wherein a Dedicated Physical Data Channel, DPDCH, and an enhanced Dedicated Physical Data Channel, E-DPDCH are configured for uplink transmissions from the UE to the receiving RAN, the UE is further configured to:
determine that a total UE transmit power exceeds a predetermined maximum power limit value;
reduce (S32) the total UE transmit power to the predetermined maximum power limit value, by reducing one or more E-DPDCH gain factors, $\beta_{ed,k}$, by a scaling factor to one or more reduced power scaling values $\beta_{ed,k,reduced}$; and
apply DTX on enhanced Dedicated Physical Control Channel, E-DPCCH, when data is transmitted on the DPDCH and a predetermined minimum E-DPDCH gain factor, or a smallest quantised $\beta_{ed,k}$ value, is reached for all E-DPDCH gain factors $\beta_{ed,k}$, and DTX is applied for all E-DPDCHs.

12. The user equipment of claim 11, wherein the total UE transmit power is divided between at least one DPDCH and a DPCCH according to a power ratio when data is transmitted on the at least one DPDCH.

13. The user equipment of claim 12, wherein the computer readable code, when run on the processing circuitry, is further configured to cause the UE to further reduce the total UE transmit power whilst maintaining the power ratio when the total UE transmit power still exceeds the predetermined maximum power limit.

14. The user equipment of claim 11 wherein when a power headroom of the UE increases, cancelling DTX on E-DPCCH when DTX is cancelled on at least one E-DPDCH.

15. The user equipment of claim 11 wherein the wireless communication network is Universal Mobile Telecommunications Systems, UMTS, wideband code division multiple access, W-CDMA.

* * * * *